July 30, 1968 J. J. HANAK ET AL 3,395,000

COMPOSITE METAL ARTICLES

Filed Jan. 27, 1965

INVENTORS
FRED D. ROSI &
JOSEPH J. HANAK
BY Glenn H. Bruestle
Attorney 3,395,000

COMPOSITE METAL ARTICLES

Joseph J. Hanak, Trenton, and Fred D. Rosi, Princeton, N.J., assignors to Radio Corporation of America, a corporation of Delaware Filed Jan. 27, 1965, Ser. No. 428,410
2 Claims. (Cl. 29—194)

ABSTRACT OF THE DISCLOSURE

A composite metal article, useful as a solenoid coil, comprises a substrate of a flexible metal, such as an alloy of nickel, molybdenum, and steel. A layer of an intermetallic superconductor is metallically united to the substrate, and a coating of a ductile metal such as silver or copper is deposited on the superconductor. A strike (thin film) of a noble metal which forms a beta-tungsten structure with the intermetallic superconductor may be deposited on the substrate before the deposition of the superconductor.

Figure 1:
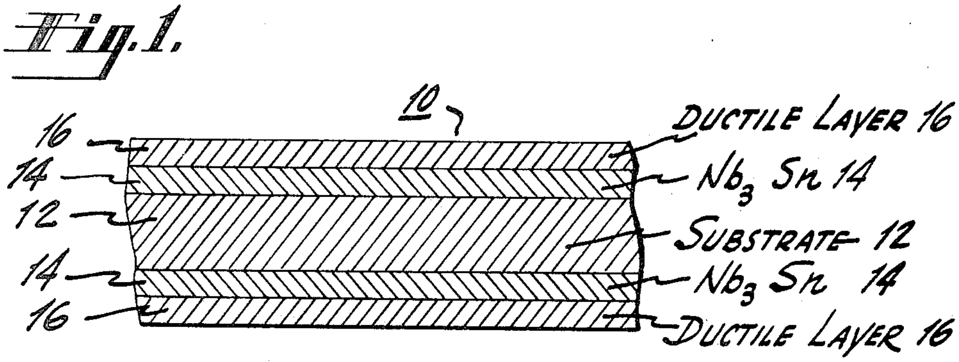

This invention relates generally to composite articles, and more particularly to improved composite articles of the type which includes one or more layers of a relatively brittle superconducting metal which are protected against cracking when stressed. The improved composite articles of the present invention are particularly useful for solenoid coils that require bending of the articles in arcs having relatively small radii of curvature.

It has been proposed to make solenoid coils of superconducting metals, such as niobium stannide ($Nb_3Sn$), for example, to provide strong magnetic fields while the superconducting metals are maintained in a superconducting state. Niobium stannide is a very desirable superconductor for use in superconducting solenoids because it possesses the characteristics of both a relatively high transition temperature and the capability of carrying a high current in comparison with other superconductors. Niobium stannide, however, is very brittle, as is characteristic of most intermetallic compounds, and a film made of it will crack if bent in a curve whose radius of curvature is smaller than a critical value. While the cracks in a layer of niobium stannide may be invisible to the naked eye, their presence in a ribbon or wire of a solenoid coil results in a decrease in the current-carrying capacity of the coil, thereby decreasing the total available flux that would otherwise be produced by the solenoid.

It is an object of the present invention to provide an improved composite article having a layer of a superconducting metal which will not crack when the article is stressed.

A further object of the present invention is to provide improved composite articles of the type described that are relatively simple in construction, easy to manufacture, and highly efficient in use.

Briefly stated, the improved composite articles of the present invention comprise a substrate of a flexible metal, such as platinum, a layer of a superconductor, e.g. an intermetallic material such as niobium stannide, deposited on the substrate, and a coating of a ductile metal, such as copper, deposited on the layer of superconductor to prevent the layer from cracking when the article is stressed.

The composite articles of the invention may be in the form of wire, ribbon, sheets, or the like.

Figure 2:
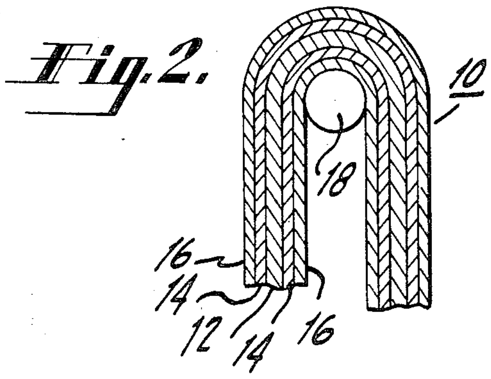

The novel features of the present invention, as well as the invention itself, both as to its organization and method of operation, will be understood more fully when considered in connection with the accompanying drawing in which similar reference characters represent similar parts throughout, and in which:

FIG. 1 is a fragmentary, sectional view of a composite metal article, such as a wire or a ribbon, taken along its longitudinal axis, in accordance with the present invention; and FIG. 2 is a fragmentary, sectional view of the composite metal article illustrated in FIG. 1, in reduced size, shown bent around a rod to demonstrate the method of providing stresses in the article for testing purposes.

Referring now particularly to FIG. 1 of the drawing, there is shown a longitudinal cross-sectional view of a composite metal article 10 in the form of a wire or a metallic ribbon of the type suitable for being made into coils for superconducting solenoids. The article 10 comprises a substrate 12 of a flexible metal on which at least one layer 14 of a superconducting metal, that is, a superconductor, is deposited, preferably from a vapor state, and a coating 16 of a ductile metal on the layer 14.

Where the superconductor is an intermetallic one, such as niobium stannide, for example, desirable metals for the substrate 12 which will permit an epitaxial deposition of niobium stannide thereon from a vapor state, are those having a beta-tungsten structure. Since such substrates are not generally available commercially, metal substrates which react with niobium in the vapor state to form a beta-tungsten structure are desirable. Suitable metal substrates 12 in this category are rhodium, osmium, iridium, platinum, and gold. These metals aid in the nucleation of niobium stannide thereon from the vapor phase. Other metals, such as nickel, molybdenum, steel, and their alloys (e.g. "Hastelloy") may also be used, but it may be desirable to coat the latter metals with a strike (a thin film) of one of the aforementioned noble metals which form a beta-tungsten structure, with niobium, before depositing a layer of niobium stannide thereon. Such a procedure aids in the nucleation of the niobium stannide and causes the niobium stannide to be deposited epitaxially, thereby providing a good metallic bond between the substrate 12 and the layer 14.

At least one layer 14 of an intermetallic superconductor, such as niobium stannide ($Nb_3Sn$), vanadium silicide ($V_3Si$), or niobium gallide ($Nb_3Ga$), is deposited on the substrate 12. Where the substrate 12 is a wire of circular cross section, the layer 14 of superconducting metal is concentric with the substrate 12. Where the substrate 12 is sheet material, the layer 14 of superconducting metal may be on either one or both of the major surfaces of the substrate 12 or may completely surround the ribbon substrate.

The superconductor layer 14 of niobium stannide may, for example, be metallically united with a substrate 12 of platinum by a vapor deposition process wherein the chlorides of niobium and tin ($NbCl_5$–$SnCl_2$, $NbCl_5$–$SnCl_4$) are reduced by hydrogen, in the vapor state, at temperatures of between 1000° C. and 1200° C. Such a process is described by J. J. Hanak in an American Institute of Metallurgical Engineer's publication, vol. 19, Metallurgy of Advanced Electronic Materials, pages 161–171, Interscience Publishers, division of John Wiley & Sons, Inc., New York, 1963. Another method of the vapor deposition of niobium stannide on a substrate is also described in U.S. Patent No. 3,268,362, Ser. No. 112,853, issued on Aug. 23, 1966, by J. J. Hanak and J. L. Cooper, for Superconductors, and assigned to the assignee of the present invention.

Layers 14 of vanadium silicide ($V_3Si$) and niobium gallide ($Nb_3Ga$) may also be deposited on the substrate 12 of the aforementioned noble metals by methods of vapor deposition known in the art.

The layer 14 of superconducting metal, such as the intermetallic compound niobium stannide, is relatively brittle in comparison to some of the ductile metals such as copper, silver, and aluminum. Accordingly, it is desirable to protect the superconductor layer 14 from cracking, as when the metal article 10 is deformed during a manufacturing process that requires bending the article 10 in an arc with a relatively small radius of curvature. The layer 14 of an intermetallic superconductor is protected from cracking, by the deposition thereon of the coating 16 of a ductile metal, such as aluminum, copper, gold, indium, lead, nickel, silver, tin, and alloys thereof. While other ductile metals may also be used for the coating 16, copper, silver, and aluminum are the most practical from the standpoints of fabrication and cost.

The protective, ductile coating 16 in the following examples, should be deposited to a thickness of at least 0.05 mil.

Example 1

A coating 16 of copper can be plated on a layer 14 of niobium stannide, vanadium silicide, or niobium gallide, employing an aqueous solution plating bath having the following ingredients:

| | oz./gal. of solution |
|---|---|
| Copper cyanide | 3.5 |
| Sodium cyanide | 4.6 |
| Sodium carbonate | 4.0 |
| Rochelle salt | 6.0 |
| Copper metal | 2.5 |
| Free NaCN | 0.75 |

The plating solution is adjusted to a pH of 12.5 with the addition of caustic soda. The plating bath is maintained at a temperature of between 130° F. and 150° F., and copper is plated on the superconductor 14 with a current density of 20–50 amperes/sq. ft. A wire or ribbon of platinum about 2 mils thick, having a niobium stannide layer deposited thereon of about 0.3 mil in thickness, is protected adequately by a copper plating of about 0.3 mil in thickness.

Example 2

A layer 14 of superconducting metal, such as niobium stannide, may be coated with a ductile coating 16 of silver by a silver plating process employing the following aqueous plating solution:

| | |
|---|---|
| Silver cyanide, oz./gal. of solution | 4.8 |
| Potassium cyanide, oz./gal. of solution | 8 |
| Potassium carbonate, oz./gal. of solution | 2 |
| Metallic silver, troy oz./gal. | 3.5 |
| Free cyanide, oz./gal. | 5.5 |

The silver may be plated onto the layer 14 of niobium stannide at room temperature (70–80° F.) employing a current density of about 5–15 amperes/sq. ft.

Example 3

A coating 16 of aluminum can be deposited on a layer 14 of a superconductor, such as niobium stannide, in a vacuum evaporator in a manner known in the art. In this method, the layer 14 of niobium stannide is cleaned with any suitable commercial cleaning solution, such as Oakite solution. Next, the cleaned layer 14 of niobium stannide is dipped into concentrated hydrofluoric acid for about one minute and then plated with aluminum in an evacuated bell jar wherein the aluminum is vaporized for condensation on the cleaned layer 14 of niobium stannide. A suitable coating 16 of aluminum is about 0.3 mils in thickness.

Example 4

A ductile coating 16 of tin of a thickness of at least 0.05 mils may be deposited on a layer 14 of superconductor such as niobium stannide by the following method. The layer 14 of niobium stannide is cleaned by any suitable commercial cleaner, such as Oakite solution, at 60° C. for five minutes. The layer 14 is washed with water, dipped in concentrated hydrofluoric acid for about one minute, and then dipped in molten tin at about 1000° C. for two minutes to form the coating 16 of tin.

Example 5

A ductile coating 16 of lead may be deposited on a layer 14 of niobium stannide by a method similar to that of Example 4, wherein the cleaned layer 14 of niobium stannide is dipped in molten lead.

Composite metal articles 10 can be tested for their ability to resist cracks in the layer 14 of superconductor by subjecting the articles 10 to bends of arcs with relatively small radii of curvature, as shown in FIG. 2. A composite article 10, for example, comprising a ribbon substrate 12 (of a nickel molybdenum alloy "Hastelloy") of about 2 mils in thickness, a layer 14 of niobium stannide on each major surface of the ribbon substrate 12 deposited to a thickness of about 0.3 mil, and a ductile coating 16 of copper deposited on the layers 14 to a thickness of about 0.3 mil, is bent around rods, such as rod 18 (FIG. 2), of different diameters and compared with a control article that was similar to the article 10 except that the control article lacked the ductile coating 16. The composite article 10 can be bent in an arc whose radius of curvature is 0.47 inch without any cracks forming in the niobium stannide layer 14. In control articles without a ductile coating 16 thereon, a number of cracks may be detected in the layers 14 under similar conditions of bending.

The cracks in the layer 14 are detected by a very sensitive test employing an etchant of one part of nitric acid to one part of hydrochloric acid. Niobium stannide does not react with the etchant, but the metal of both the ductile coating 16 and the substrate 12 do react with the etchant. Hence, any cracks in the layer 14 of the intermetallic superconductor may be detected by inserting the articles 10 (with and without the coating 16) in the etchant. In those articles where cracks have developed, the etchant penetrates the cracks and dissolves the substrate, whereby the article 10 falls apart.

From the foregoing description, it will be apparent that there has been provided an improved composite article comprising a flexible substrate, a layer of an intermetallic superconductor on the substrate, and a ductile metal coating on the layer to protect the relatively fragile layer from cracking when stressed. While only a few embodiments of the composite metal article of the present invention have been described, variations in their construction, all coming within the spirit of the invention, will, no doubt, readily suggest themselves to those skilled in the art. Hence, it is desired that the foregoing description shall be considered as illustrative and not limiting.

What is claimed is:

1. A composite article comprising a substrate of a flexible metal selected from the group consisting of nickel, molybdenum, steel, and alloys thereof, a layer of niobium stannide metallically united to said substrate, and a coating of a ductile metal on said niobium stannide layer, said ductile metal being selected from the group consisting of aluminum, copper, gold, indium, lead, nickel, silver, tin, and alloys thereof.

2. A composite article comprising a substrate of a flexible metal selected from the group consisting of nickel, molybdenum, steel, and alloys thereof,
   a strike of a metal selected from the group consisting of rhodium, osmium, iridium, platinum, gold, and alloys thereof on said substrate,
   a layer of niobium stannide metallically united to said strike, and
   a ductile metal selected from the group consisting of aluminum, copper, gold, indium, lead, nickel, silver, tin, and alloys thereof, coated on said layer.

References Cited

UNITED STATES PATENTS

| | | | |
|---|---|---|---|
| 3,115,612 | 12/1963 | Meissner. | |
| 3,243,871 | 4/1966 | Saur | 29—194 X |
| 3,259,866 | 7/1966 | Miles et al. | |
| 3,262,187 | 7/1966 | Allen et al. | |
| 3,293,008 | 12/1966 | Allen et al. | 29—194 X |
| 3,309,179 | 3/1967 | Fairbanks | 29—194 |

ALFRED L. LEAVITT, *Primary Examiner.*

C. K. WEIFFENBACH, *Assistant Examiner.*